June 13, 1950   G. GRINDROD   2,511,582
PROCESS AND APPARATUS FOR COOLING
MILK AND OTHER LIQUIDS
Filed Sept. 12, 1945
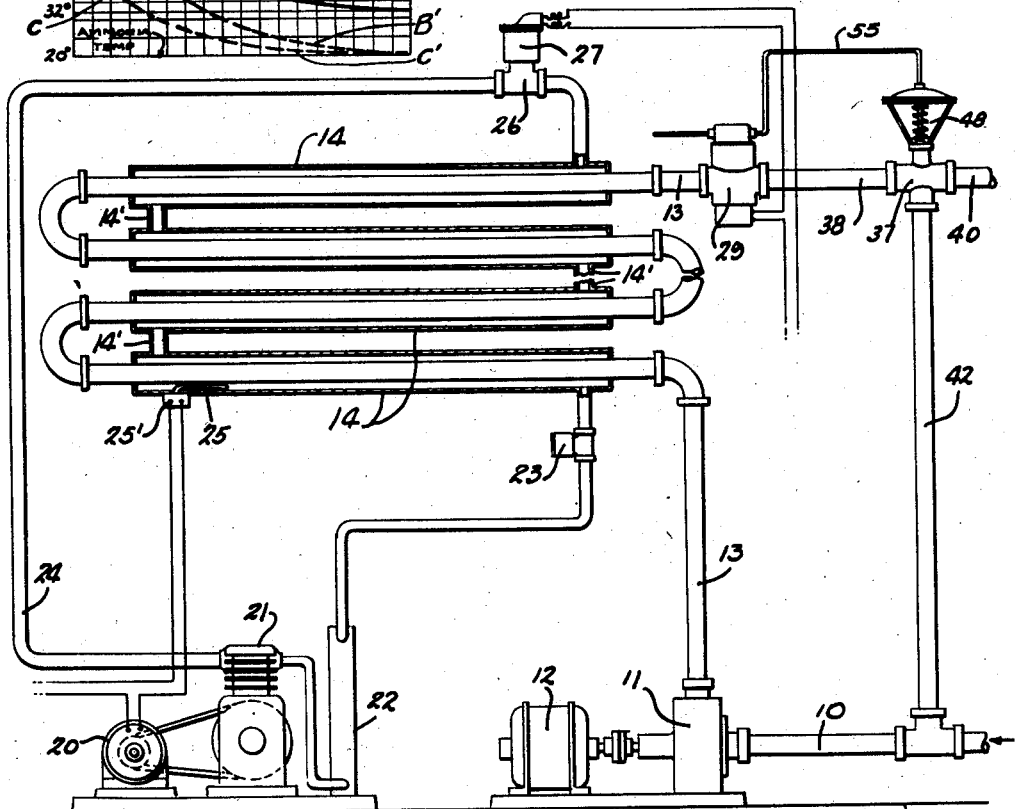
INVENTOR.
GEORGE GRINDROD
BY Wheeler, Wheeler & Wheeler
ATTORNEYS Patented June 13, 1950

2,511,582

UNITED STATES PATENT OFFICE 2,511,582

PROCESS AND APPARATUS FOR COOLING MILK AND OTHER LIQUIDS

George Grindrod, Oconomowoc, Wis.

Application September 12, 1945, Serial No. 615,823

19 Claims. (Cl. 62—7)

My invention relates to improvements in processes and apparatus for cooling milk and other liquids to low temperatures critically near the freezing point.

My primary object is to obtain a coefficient of heat transfer approximately three times as great as that heretofore obtained in direct expansion coolers.

More particularly, the objects of my invention are to provide an improved method and improved apparatus for quickly and efficiently reducing the temperature of milk and similar liquids to a point critically near the freezing point of such liquids without oxidation or destruction of ascorbic acid and while maintaining a continuous flow of the liquid to be cooled through a passage which is closed except at inlet and outlet points, and which has walls at a temperature materially below the freezing point, without danger of coating such walls with ice or clogging the passages; to obtain a rate of heat transfer several times as rapid as that heretofore obtainable in direct expansion coolers; to provide for automatically and continuously testing the temperature and pressure of the circulating liquid and recirculating such portions thereof as may be necessary to ensure its delivery at a uniform predetermined low temperature regardless of variations in the initial temperature or in the volume and velocity of the circulating liquid.

A further object is to provide a tubular cooler for milk and similar liquids combining the advantages of high power efficiency, maximum heat transfer efficiency, protection of the milk from oxidation and loss of vitamins, maintenance of a more uniform rate of cooling than has been heretofore accomplished, particularly while the liquid is approaching the minimum desired temperature, and regulating the degree of recirculation in such a manner as to provide for a continuous and constant delivery at the desired minimum temperature.

A further object is to provide means whereby a supply of circulating refrigerant may be reduced or cut off whenever the circulation of the liquid to be cooled is reduced either by a clogging of the passages or a failure of the supply.

My object is to provide for utilizing an internal tubular cooler with direct expansion refrigeration, (1) whereby the coefficient of heat transfer may be made about three times that heretofore obtained in direct expansion coolers, (2) whereby a higher effective mean temperature difference (M. T. D.) between milk and refrigerated cooling surfaces may be maintained, and (3) whereby oxidation of the milk or destruction of ascorbic acid (vitamin C) is avoided.

Direct expansion coolers heretofore have been operated at very low velocities, the flow of the milk being maintained generally about 1 ft. per second on the assumption that the milk must stay in contact with the heat absorbing surface long enough to have its temperature reduced to the desired degree. I have found this theory to be incorrect, my tests having demonstrated that the heat transfer is a function of velocity. When using stainless steel tubes of 1½ inch diameter and 0.05 inch in wall thickness, the heat transfer in terms of B. t. u. per square foot of heat absorbing surface per minute per degree F. follows the formula $H=0.82V-1.3$. The velocity (V) is measured in feet per second. According to measurements made in deriving the above relationship, a tubular gravity flow cooler of usual design has a transfer co-efficient of 0.5 B. t. u. A thin corrugated metal direct expansion cooler will give a coefficient up to about 1.2 B. t. u. Compared to these the constant velocity tubular cooler herein described has a co-efficient of 3.0 B. t. u. at its minimum velocity of 5 ft. per second and 7.1 B. t. u. at a velocity of 10 ft. per second of a stream of milk passing continuously through the cooler.

The advantage of high mean temperature difference is derived from the maintenance of a sustained velocity, high enough to prevent adhesion of ice to the heat absorbing surfaces of the cooler. Under such circumstances, the cooling curve approaches the ammonia temperature as its limit, whereas in the low velocity coolers the cooling curve approaches 32 degrees as the limit, this being the temperature of the ice film. For example, assume that milk has to be cooled from 60 degrees F. to 34 degrees F., the ammonia suction being maintained at 20 degrees F. For the gravity flow surface cooler the rate of cooling to 34 degrees is as follows:

$$\text{M. T. D.}=\frac{(60-32)-(34-32)}{\log_e\left(\frac{60-32}{34-32}\right)}=\log_e\frac{26}{14}=9.88°$$

For the tubular cooler with sustained velocity as hereinafter described, the rate of cooling to 34 degrees is as follows:

$$\text{M. T. D.}=\frac{(60-20)-(34-20)}{\log_e\left(\frac{60-20}{34-20}\right)}=\log_e\frac{26}{40}\frac{}{14}=24.8°$$

For the tubular cooler hereinafter described, assuming that 50% recirculation will be maintained in a manner to reduce the entering temperature to 47° F., the following value of M. T. D. will result:

$$M.T.D. = \frac{(47-20)-(34-20)}{\log_e \left(\frac{47-20}{34-20}\right)} = \log_e \frac{13}{\frac{27}{14}} = 19.8°$$

The advantage of increasing the value of M. T. D. is greatest under those conditions where cooling to near freezing is wanted. Where the refrigerating surfaces cannot be maintained below ice temperature, the rate of cooling approaches zero as the temperature at the outlet of the heat exchanger approaches 32 degrees F. This is graphically shown in Figure 4 of the accompanying drawings, which illustrates "the hyperbolic curves of cooling."

Cooling of milk to near freezing temperature out of contact with air is particularly important in connection with the preparation of milk for shipment. When cooled by surface coolers as heretofore, much oxygen is dissolved, the ascorbic acid is destroyed, and the milk become stale. Therefore the only means in commercial practice for complete cooling has been by brine, which is expensive in the use of power.

In the drawings:

Figure 1 is a conventional illustration, in elevation, of a milk cooler embodying my invention.

Figure 2 is a detail view in vertical section showing my temperature and pressure indicator on an enlarged scale.

Figure 3 is a similar detail, showing the recirculating valve mechanisms.

Figure 4 is a time-temperature diagram showing the hyperbolic curves of cooling under different conditions.

Like parts are identified by the same reference characters throughout the several views.

By my improved process, the milk or other liquid to be cooled is driven in a continuous stream of constant volume and at a scouring velocity in contact with heat absorbing surfaces, access of oxygen or air to the milk being prevented.

The temperature of the heat absorbing surfaces is constantly maintained at a degree materially below the freezing point of the liquid, whereby a rapid heat transfer is maintained after the circulating liquid has been reduced in temperature to approximately the freezing point.

I have found that by maintaining the liquid to be cooled at a scouring velocity of 5 ft. or more per second, flakes of ice tending to form on a heat absorbing surface materially below the freezing point of the liquid are prevented from coating that surface, and are scoured therefrom and carried away in a colloidal condition, the heat absorbing surface being thus kept clean and free of ice, which would otherwise interfere with or reduce the heat transferring efficiency of the cooler and also tend to reduce the capacity of the cooler by tending to obstruct the liquid to be cooled. I also find that the liquid in such motion develops a more rapid rate of heat transfer than can be obtained with static liquid or with liquid in relatively slow motion, and I am thus enabled to quickly bring the temperature of the milk or other liquid down to approximately the freezing point while circulating it through pipes or passages, and under such circumstances, I can avoid clogging the pipes or walls thereof.

I provide for automatically and continuously testing the liquid which is being cooled, both as to its temperature and pressure. If its temperature has been reduced to the desired degree it may be delivered to a container or other point of discharge, and if not, it is by-passed through the source of supply, mixed with the incoming unchilled liquid and recirculated over the refrigerated surfaces until the temperature of the liquid at the testing point reaches the desired degree.

Thereafter all of the liquid may be delivered to the container, or, if desired, part of it may continue to be by-passed in sufficient quantity to reduce the temperature at the heat exchanger inlet to such an extent that the time required for chilling the liquid to the desired degree may be correspondingly reduced.

If the temperature of the liquid to be cooled is at any time reduced below the freezing point sufficiently to prevent the particles of ice from being scoured away from the refrigerating surfaces, thereby obstructing the flow of the liquid and interfering with heat transfer, or if, for any other reason, the velocity of the liquid is reduced below that required for scouring flakes of ice from the refrigerating surfaces, the refrigeration of such surfaces is reduced or checked until the rate of flow has again been restored to said scouring velocity and normal volume.

To facilitate carrying out my improved process, I prefer to use the apparatus disclosed in the drawings.

In that apparatus, warm milk is delivered through a supply pipe 10 to a pump 11, usually at a temperature of about 60 degrees F. The pump 11 may be operated by an electric motor 12 at a speed to drive the milk at a velocity of about 5 or 10 feet per second through a pipe 13 which leads axially through the expansion chamber of a refrigerating heat exchanger of ordinary type. In the heat exchanger illustrated, a series of cylinders 14, connected by pipes 14', are supplied with a suitable refrigerant at a predetermined low temperature, preferably at such a temperature that the refrigerant in the last pipe 14 of the series can be kept at about 20 degrees F., thus maintaining a wide spread in temperature between the heat of the refrigerant and that of the circulating milk. Therefore, even in the last pipe section 14 of the series a rapid heat transfer may be maintained.

In Figure 1 the motor 20 operates a compressor 21 to place the refrigerant under pressure preparatory to its liquefaction in a condenser 22 and deliver it to the cylinder 14 through an expansion valve at 23, the refrigerant returning to the compressor through the pipes 24 in accordance with the common practice in refrigerators of the condenser expander type. A thermostat at 25 is exposed to the refrigerant in the first cylinder section 14 and operates a suitable switch 25' to control the motor circuit and automatically stop the motor 20 when the temperature to which the thermostat is exposed drops below the desired degree.

In the construction shown, the outside diameter of the milk pipe 13 is 1½ inches, and the total length of the expansion chamber represented by the pipe sections 14 should be about 144 feet to provide for a reduction in the temperature of the milk from 60 degrees F. to 32 degrees or 34 degrees F., at the calculated rate of heat transfer into a refrigerant circulating under the described conditions. About 16 cylinder sections 14, each 9 feet in length, would provide an expansion chamber of 144 feet in length.

The return pipe 24 is provided with a normally closed valve at 26 which may be automatically opened by an associated solenoid 27 when the latter is energized. In the construction illustrated, the valve may be assumed to close downwardly with the pressure of the liquid in the return pipe 24, and its stem is connected with a superposed solenoid core which is lifted to open the valve when the solenoid is energized. The circuit of the solenoid is controlled by an electric switch 28 (Figure 2), mounted on a fitting 29 having a milk passage 30 connected with the outlet end of the pipe 13.

At one side of the passage 30 a diaphragm 31 is exposed to the pressure of the milk in the passage, and this diaphragm is connected with a switch lever 32 controlling the circuit of the solenoid 27, as indicated in Figure 1. When a normal pressure of the milk in the passage 30 is being maintained, the diaphragm 31 will hold the switch 32 in its closed position. But when the pressure in the passage 30 drops below the normal pressure required to maintain a flow of approximately 10 feet per second, the connected end of switch lever 32 will be lifted and its other end depressed by a spring 34 into engagement with the casing, thus disengaging the switch lever from the contact terminal 33 and de-energizing the solenoid to allow valve 26 to close and stop circulation of the refrigerant through the expansion chamber of the refrigerator, i. e., the cylinders 14. Thereupon circulation of the refrigerant ceases, and its temperature is allowed to rise toward normal room temperature until the rate of flow of the milk through the fitting 29 is again restored to the normal or predetermined velocity.

It will of course be understood that in the construction illustrated the velocity of the milk flow through the passage 30 of the fitting 29 is a function of the pressure at which it is delivered to the fitting, and inasmuch as the pressure in the passage 30 will be reduced whenever an accumulation of ice on the inner surfaces of the pipe 13 reduces the capacity of that pipe, both the pressure and rate of flow through the passage 30 will be reduced accordingly. A similar reduction in pressure and velocity in the passage 30 will occur whenever the milk supply is reduced, although in that case the pressure at which the milk is delivered into the pipe 13 by the pump will be reduced accordingly, thereby increasing the tendency to freeze and clog the pipe 13. In either case, freezing of milk in the pipe 13 in such a manner as to clog or burst the pipe must be prevented, and this is done automatically whenever the pressure in the fitting drops sufficiently to allow the spring 34 to open the switch 32, de-energize the solenoid 27, and allow the valve 26 to close.

As shown in Figure 1, the fitting 29 is connected with another fitting 37 by a pipe 38, and the direct passage 39 through the fitting 37 leads to a delivery pipe 40. This fitting, however, has a downwardly extending outlet portion 41 connected by a by-pass pipe 42 with the supply pipe 13.

The passage 39 has a partition at 43, apertured and provided with a valve seat 44 against the partition, as shown in Figure 3. This valve may be held against the seat 44 by a valve stem or rod 46, which projects into a diaphragm chamber having a diaphragm 47, urged upwardly by a spring 48. The portion 41 of the fitting 37 also has ported connection with the passage 39 and is provided with a valve seat 52 with which valve 45 may contact when the diaphragm 47 is depressed to move the valve away from the seat 44.

Diaphragm 47 may be depressed by air supplied to the upper portion of the diaphragm chamber through a pipe 55 connected with a suitable source of air pressure supply (not shown).

The fitting 29 has an upward extension 57 from which a thermostatic air bulb 58 depends in contact with the milk flowing through the passage 30. This air bulb 58 forms part of an ordinary thermostatic control valve mechanism, having a valve at 60 which controls the flow of air through the pipe 55 to the diaphragm chamber.

When the milk in passage 30 is too warm for delivery through the pipe 40, the pressure in the bulb 58 will hold the valve 60 in a position to stop the flow of air through the pipe 55. In this position the diaphragm chamber above the diaphragm 47 will be vented through the air outlet 62, but as soon as the milk in passage 30 reaches the desired low temperature, the pressure in bulb 58 drops and valve 60 moves away from the seat 63 and closes upon the seat 64, thus allowing air to flow through the pipe 55 to the upper portion of the diaphragm chamber, thereby moving diaphragm 47 downwardly against the pressure of spring 48 and carrying valve 45 toward a position closing the by-pass and opening passage 39 to delivery pipe 40. These two valves, 44 and 60, operate in alternation to cause either a recirculation of the milk through the by-pass 42 or its final delivery through the pipe 40. It is not necessary that valve 44 should completely close upon the seat 45. A collar 49 adjustably threaded upon or otherwise secured to rod 46 may be used to limit the downward movement of valve 44 and thus prevent it from closing upon the seat 45. When this is done, a portion of the milk will always be recirculated.

It will be understood that advantage of compactness is the reason for making the refrigerating chamber in a series of connected sections 14 instead of providing a single long continuous cylinder. Also, that the length of the refrigerating chamber as represented by the combined lengths of the cylindrical members 14, may be varied in accordance with the desired degree of temperature reduction, the size of the milk pipe 13, the thickness or conductivity of its walls and the temperature of the refrigerant.

Assuming that the milk at the source of supply is at a temperature of 60 degrees F., its temperature at the pump 11 will be considerably reduced as soon as recirculation through the by-pass 42 commences. Therefore, if desired, the length of the refrigerating chamber may be considerably reduced from that above described, if the by-pass is never fully closed and some of the milk is being constantly recirculated. In such case the suction of the pump 11 can be relied upon to draw some milk through the by-pass in all positions of valve 42.

In Figure 4 the line A indicates the hyperbolic cooling curve of a prior art surface cooler in which the refrigerated surface is kept at 32 degrees F. It will be noted that after the temperature of the milk has been reduced below 40 degrees, this hyperbolic curve so closely approaches the horizontal that the time required to obtain a temperature of 33 or 34 degrees is greatly prolonged, whereas in curve B the divergence is not only apparent from the start at 60 degrees temperature, but the line is nearly straight and the temperature of the milk is reduced to about 32 degrees in about 7 seconds. With 50% recirculation, the milk enters the cooler at about 47 degrees F. and leaves it at approximately 32 degrees F. in less than 4 seconds, as represented by the hyperbolic curve C, the ammonia temperature being maintained at approximately 20 degrees F.

The dotted lines B'—C' extending the curves B and C below the horizontal temperature line indicating 32 degrees F., represent the theoretical curves which would be formed if the liquid were non-freezing and were ultimately reduced to the ammonia temperature.

One object of providing for a by-pass recirculation is to permit maintenance of a predetermined velocity regardless of the volume delivered from the source of milk supply. The minimum velocity which will prevent freezing of ice film in a 1½ inch stainless steel tube has been found to be about 5 ft. per second. If the milk is being cooled to 34 degrees F. by ammonia as the refrigerating agent, maintained at 20 degrees F. in contact with the exterior surfaces of such tubing, at a velocity of about 5 ft. per second, 12,000 pounds of milk per hour may be pumped through such a 1½ inch tube, the internal cross sectional area of which is 1.54 square inches. At a velocity of 10 ft. per second, the heat transfer coefficient is more than doubled. At that rate, 22,000 pounds per hour may be pumped through the tube, and by recirculating about one half of it to maintain a net output of 12,000 pounds per hour, the M. T. D. may be reduced from 24.8 degrees to 19.8 degrees, but the heat transfer coefficient would be increased from 3 B. t. u. to 7.1 B. t. u. Thus, the net increase in cooler capacity would be represented by the ratio: 24.8×3:19.8×7.1=77.4:140.7=1:1.87.

This would be at the expense of greater power of pumping. If the volume of milk to be cooled is less than that required to give at least 5 ft. per second, then recirculation is required. Otherwise the milk would freeze unless the temperature of the refrigerating ammonia is raised. If more than 5 ft. per second is obtained by the normal flow of the milk, then recirculation may not be required to obtain the desired reduction in temperature, but the capacity would be increased. Since the power required to pump at 10 ft. per second is over four times that required to pump at 5 ft. per second, there is ordinarily no advantage obtained in maintaining a rate of flow much above the minimum. Accordingly, the usual practical working range of velocity is at a point somewhere between 5 ft. per second and 10 ft. per second, provided the ammonia suction is maintained at approximately 35 lb. gauge. If the ammonia compressor has sufficient capacity, the capacity of the cooler may be greatly increased by reducing the ammonia pressure and simultaneously increasing the velocity and recirculation. This cooler therefore has the advantage of great flexibility of capacity, together with high heat transfer efficiency at or near the freezing point.

I claim:

1. The process of rapidly cooling milk and other liquids to a degree slightly above their freezing point, consisting in forcing the liquid in a confined stream and at a scouring velocity in heat exchanging proximity to a flowing refrigerant having a temperature below the freezing point of said liquid and materially below the ultimate temperature to which such liquid is to be reduced, whereby to maintain a substantial temperature differential between the refrigerant and all portions of said liquid to maintain a rapid heat exchange throughout the cooling interval, and varying the rate of flow of the refrigerant in proportion to variations in the pressure and velocity of said stream as it passes out of heat exchanging proximity to the refrigerant.

2. The process of rapidly cooling milk and other liquids from a temperature of about 60° F. to a temperature of about 32° F., consisting in piping the liquid under pressure and at a scouring velocity while maintaining the pipe at a temperature sufficiently below the freezing point of the liquid to maintain a rapid heat exchange while the liquid is approaching its freezing point, mixing some of the cooled liquid with that coming from the source of supply to effect an immediate reduction in the temperature of the inflowing stream, and raising the temperature of the pipe when the pressure and velocity of the cooled liquid falls below that at which the liquid is normally delivered from the pipe.

3. The process of rapidly cooling milk to a temperature near the freezing point of the milk, which consists in causing the milk to flow in a confined stream and at a scouring velocity in heat exchanging proximity to a circulating stream of refrigerant until the milk is reduced in temperature to about 32° F., normally maintaining the temperature of the refrigerant at a temperature greatly below the ultimate temperature of the milk and substantially below the freezing point of the milk, and reducing the rate of flow of the refrigerant when the pressure of the milk in the confined stream leaving the refrigerant drops materially below the pressure at which it was delivered into heat exchanging proximity to the refrigerant.

4. Means for rapidly cooling liquid from a temperature of about 60° F. to a temperature of about 32° F., comprising in combination, a heat exchanger having a pipe for liquid to be refrigerated and a jacket for a refrigerant at a temperature materially below the freezing point of said liquid, means for forcing liquid through the pipe at a scouring velocity, a flexible diaphragm exposed to the pressure of the liquid in the outlet portion of said pipe, a spring for urging the diaphragm in opposition to the pressure of the liquid thereon, refrigerant connections to the jacket including a valve, and means connecting the diaphragm, with the valve for regulating the delivery of refrigerant to the heat exchanger.

5. Means for rapidly cooling liquid from a temperature of about 60° F. to a temperature of about 32° F., comprising in combination a heat exchanger having a pipe for such liquid and a jacket for refrigerant at a temperature materially below the freezing point of said liquid, means for forcing liquid through the pipe at a scouring velocity, a flexible diaphragm exposed to the pressure of the liquid in the outlet portion of said pipe, a spring for urging the diaphragm in opposition to the pressure of the liquid thereon, refrigerant connections to the jacket including a valve, and means connecting the diaphragm with the valve, for varying the delivery of refrigerant to the heat exchanger, together with thermostatically controlled means for recirculating some of the cooled liquid through said pipe.

6. Means for rapidly cooling liquid from a temperature of about 60° F. to a temperature of about 32° F., comprising in combination, a heat exchanger having means for circulating refrigerant therethrough at a temperature materially below the freezing point of such liquid, a heat exchanging pipe for circulating liquid through the heat exchanger, means for delivering liquid through said pipe at a scouring velocity, a flexible diaphragm exposed to the pressure of the liquid in the outlet portion of the pipe, a spring for urging the diaphragm in opposition to the pressure of the liquid thereon, a valve having actuating connections controlled by the diaphragm for varying the delivery of refrigerant to the heat exchanger, a by-pass connecting the outlet end portion of said pipe to the inlet portion, a thermostatically controlled valve in said by-pass for regulating the flow of liquid therethrough, and means for preventing the valve from moving to a completely closed position, whereby some of the cooled liquid is continuously mixed with that coming from the source of supply to instantly reduce its temperature.

7. In a milk cooler having a heat exchanger for maintaining a rapid heat reduction from the milk while its temperature is approaching the freezing point, the combination with a milk conveying pipe extending through the heat exchanger, of a fitting in the outlet portion of the pipe having a diaphragm subject to the pressure of the milk, a valve controlling delivery of refrigerant to the heat exchanger, a solenoid for opening the valve, a switch operatively connected with the diaphragm for controlling an electric circuit through the solenoid, and means for exerting a counter pressure on the diaphragm to move the switch to open position when the milk pressure in the fitting drops below normal.

8. In a milk cooler having a heat exchanger for maintaining a rapid heat reduction from the milk while its temperature is approaching the freezing point, the combination with a milk conveying pipe extending through the heat exchanger, of a fitting in the outlet portion of the pipe having a diaphragm subject to the pressure of the milk, a valve controlling delivery of refrigerant to the heat exchanger, a solenoid for opening the valve, a switch operatively connected with the diaphragm for controlling an electric circuit through the solenoid, means for exerting a counter pressure on the diaphragm to move the switch to open position when the milk pressure in the fitting drops below normal, said fitting being provided with a thermostat, and means controlled by the thermostat for by-passing some of the milk for recirculation through the heat exchanger.

9. In a milk cooler having a heat exchanger provided with means for delivering a refrigerant thereto at a temperature materially below 32° F. and a pipe system for conveying milk through the heat exchanger and having a milk delivering portion, said system including a valved by-pass for recirculating some of the milk through the heat exchanger until the temperature of the milk approaches the freezing point, the combination therewith of a thermostat connected with the by-pass valve for controlling circulation through the by-pass, means controlling refrigerant delivery to said exchanger, and pressure responsive means mounted in the said delivering portion and connected to said refrigerant controlling means for checking deliveries of refrigerant to the heat exchanger when the milk pressure in the fitting drops below normal.

10. In a milk cooler of the described class, the combination with means for circulating and recirculating milk through a heat exchanger at a scouring velocity, of a fitting through which the milk is delivered after being cooled in the heat exchanger, said fitting having a thermostat responsive to the temperature of the milk passing through the fitting, said means being provided with a valve operatively connected with the thermostat for control thereby.

11. A method of rapidly cooling a liquid to a temperature near its freezing point, such method consisting in forcing the liquid in a confined stream and at a scouring velocity across a heat exchange surface while maintaining such surface at a temperature greatly below the ultimate temperature of the liquid and substantially below the freezing point of said liquid, the temperature differential between the liquid and such surface being sufficiently great to effect a nearly rectilinear curve of temperature drop of the liquid to the desired temperature, the velocity of flow of the liquid keeping the liquid from freezing on such surface, and mixing a first component of the liquid cooled in traversing such surface with a second component of liquid previous to its traverse of such surface whereby to effect rapid initial cooling of said second component and to maintain a desired scouring velocity of flow and rate of heat exchange between such liquid and such surface.

12. A method of rapidly cooling milk to a temperature in proximity to its freezing point, such method consisting in passing the milk at a scouring velocity of at least approximately five feet per second through a heat exchange tube, refrigerating the tube to a temperature materially below the freezing point of the milk, and removing the milk from the refrigerated tube at a temperature materially above the temperature to which the tube is refrigerated, whereby the milk is at all times during contact with the refrigerated tube subject to a substantial temperature differential which effects rapid cooling of the milk, the rate of milk flow through the tube precluding the freezing of milk thereto, together with the further step of recirculating a portion of the milk which has traversed such tube in admixture with a portion of the milk which has not yet traversed such tube, whereby to reduce the temperature of the latter milk portion and to reduce the temperature differential between the total body of milk and the tube while compensating for such reduced differential by accelerating heat exchange in consequence of the increased velocity required for such recirculation.

13. A method of rapidly cooling a liquid to a temperature near its freezing point which comprises forcing the liquid in a confined stream and a scouring velocity across a heat exchange surface having a sub-freezing temperature, and recirculating a portion of the liquid into contact with portions of such liquid which have not yet traversed said surface whereby to effect instant cooling of said last mentioned portions and to augment the rate of flow over said surface.

14. The method recited in claim 13 wherein the amount of liquid recirculated is varied in proportion to the temperature of the liquid leaving such surface.

15. A method of rapidly cooling liquid, which method consists in passing the liquid over a heat absorbing surface in a continuous stream, diverting a portion of said stream which has traversed such surface, and recirculating the diverted portion of said stream over said surface in admixture with another portion of said stream which has not previously traversed said surface.

16. The method recited in claim 15 in which the volume of the diverted portion of the stream is varied in proportion to the temperature of the stream after being acted upon by said surface.

17. Apparatus for rapidly reducing the temperature of a liquid, said apparatus comprising a heat exchanger having a pipe for the liquid to be cooled, a jacket about the pipe for refrigerant, a pump connected with the pipe for circulating therethrough the liquid to be cooled, and a by pass for recirculation of a portion of the cooled liquid through a portion of said jacket with other liquid.

18. The device of claim 17 in which the said jacket is provided with refrigerant supply connections and refrigerant flow controlling means for maintaining the jacketed portion of the pipe at a temperature materially below the freezing point of the liquid to be cooled, and said pump being adapted to force liquid through said pipe at scouring velocities sufficient to preclude the freezing of the liquid on the pipe, said velocity being increased by the volume of liquid recirculated.

19. The device of claim 17 in which the said jacket is provided with refrigerant supply connections and refrigerant flow controlling means for maintaining the jacketed portion of the pipe at a temperature materially below the freezing point of the liquid to be cooled, and said pump being adapted to force liquid through said pipe at scouring velocities sufficient to preclude the freezing of the liquid on the pipe, said velocity being increased by the volume of liquid recirculated, together with a thermostatically controlled valve regulating recirculation.

GEORGE GRINDROD.

REFERENCES CITED

The following references are of record in the file of this patent:

UNITED STATES PATENTS

| Number | Name | Date |
|---|---|---|
| 2,107,053 | Coons | Feb. 1, 1938 |
| 2,316,845 | Craft | Apr. 20, 1943 |
| 2,389,106 | Marshall | Nov. 13, 1945 |
| 2,433,475 | Murray | Dec. 30, 1947 |